US009820091B1

(12) United States Patent
Kumar et al.

(10) Patent No.: US 9,820,091 B1
(45) Date of Patent: Nov. 14, 2017

(54) POSITION DETERMINATION USING MULTI-SUBSCRIPTION SELECTIVE DIVERSITY

(71) Applicant: QUALCOMM Incorporated, San Diego, CA (US)

(72) Inventors: Akash Kumar, Hyderabad (IN); Sai Pradeep Venkatraman, Santa Clara, CA (US); Ankit Maheshwari, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/402,964

(22) Filed: Jan. 10, 2017

(51) Int. Cl.
*H04W 24/00* (2009.01)
*H04W 4/02* (2009.01)

(52) U.S. Cl.
CPC .................................. *H04W 4/02* (2013.01)

(58) Field of Classification Search
CPC ........................................................ H04W 4/02
See application file for complete search history.

(56) References Cited

U.S. PATENT DOCUMENTS

| 8,457,653 | B2* | 6/2013 | Ledlie | G01S 5/0236 455/404.2 |
|---|---|---|---|---|
| 9,712,973 | B2* | 7/2017 | Shih | H04W 4/025 |
| 2010/0311402 | A1 | 12/2010 | Srinivasan et al. | |
| 2013/0079000 | A1 | 3/2013 | Syrjarinne et al. | |
| 2013/0203438 | A1 | 8/2013 | Shin | |
| 2015/0099516 | A1 | 4/2015 | Nayak et al. | |
| 2017/0127217 | A1* | 5/2017 | Miao | H04W 4/003 |
| 2017/0142617 | A1* | 5/2017 | Batchu | H04W 36/0005 |
| 2017/0208611 | A1* | 7/2017 | Chincholi | H04B 17/318 |

FOREIGN PATENT DOCUMENTS

WO    2014012562 A1    1/2014

* cited by examiner

*Primary Examiner* — Ajit Patel
(74) *Attorney, Agent, or Firm* — Muncy, Geissler, Olds & Lowe, P.C.

(57) ABSTRACT

Disclosed are methods and apparatuses for determining a location of a wireless mobile device. In an aspect, the wireless mobile device determines whether there is a preferred subscription for performing positioning operations of the wireless mobile device at a coarse location of the wireless mobile device, wherein the preferred subscription is one of a plurality of subscriptions associated with the wireless mobile device that provides a more accurate location of the wireless mobile device than remaining subscriptions of the plurality of subscriptions, and, responsive to a determination that the preferred subscription for performing the positioning operations of the wireless mobile device at the coarse location of the wireless mobile device exists, utilizes the preferred subscription for the positioning operations of the wireless mobile device.

20 Claims, 7 Drawing Sheets

POSITION DETERMINATION USING MULTI-SUBSCRIPTION SELECTIVE DIVERSITY

BACKGROUND

1. Field of the Disclosure

Aspects relate to position determination using multi-subscription selective diversity.

2. Description of the Related Art

Multi-Subscriber Identity Module (multi-SIM) wireless mobile devices have become increasingly popular because of the different costs associated with different services from different service providers. One type of multi-SIM wireless mobile device, a dual-SIM dual active (DSDA) device, allows simultaneous active connections with the networks corresponding to two SIMs. DSDA devices typically have separate transmit/receive chains associated with each SIM. Another type of multi-SIM wireless mobile device, a dual-SIM dual standby (DSDS) device, allows selective communication on a first network while listening for pages on a second network. Such a single receive (SR) configuration in a multi-SIM wireless mobile device is a very common implementation in low/value tier markets.

Position location determination and its accuracy is a growing challenge for wireless mobile devices. With more and more complex signal fading scenarios and the need to perform positioning operations in indoor environments, providing an accurate wireless mobile device position even when using the latest Long-Term Evolution (LTE) positioning protocol (LPP) remains an area of interest.

LPP supports Observed Time Difference of Arrival (OTDOA) as one of the mechanisms for position determination. This technique involves a wireless mobile device receiving assistance data (AD) from the network that assists the wireless mobile device to identify and measure positioning signals from multiple neighboring cells. The wireless mobile device can then estimate its own position based on the relative OTDOA of the positioning signals from the neighboring cells, or it can transmit the OTDOA measurements to the network to estimate the position of the wireless mobile device.

LPP thus involves multiple measurements of multiple neighboring cells, which is battery consuming, especially in IDLE mode, and affects the standby time of the wireless mobile device. This problem is even more severe for multi-SIM wireless mobile devices because the multiple subscriptions of the device will each perform these measurements. Another problem is that different subscriptions may provide different accuracy at different geographic locations based on that subscription's current serving cell, geometry of the available neighbors, synchronization, etc.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

A method of determining a location of a wireless mobile device includes determining, by the wireless mobile device, whether there is a preferred subscription for performing positioning operations of the wireless mobile device at a coarse location of the wireless mobile device, wherein the preferred subscription is one of a plurality of subscriptions associated with the wireless mobile device that provides a more accurate location of the wireless mobile device than remaining subscriptions of the plurality of subscriptions, and, responsive to a determination that the preferred subscription for performing the positioning operations of the wireless mobile device at the coarse location of the wireless mobile device exists, utilizing, by the wireless mobile device, the preferred subscription for the positioning operations of the wireless mobile device.

A wireless mobile device for determining a location of the wireless mobile device includes at least one processor configured to: determine whether there is a preferred subscription to perform positioning operations of the wireless mobile device at a coarse location of the wireless mobile device, wherein the preferred subscription is one of a plurality of subscriptions associated with the wireless mobile device that provides a more accurate location of the wireless mobile device than remaining subscriptions of the plurality of subscriptions, and utilize, responsive to a determination that the preferred subscription to perform the positioning operations of the wireless mobile device at the coarse location of the wireless mobile device exists, the preferred subscription for the positioning operations of the wireless mobile device.

A non-transitory computer-readable medium storing computer-readable instructions for determining a location of a wireless mobile device includes computer-readable instructions that include at least one instruction to cause the wireless mobile device to determine whether there is a preferred subscription to perform positioning operations of the wireless mobile device at a coarse location of the wireless mobile device, wherein the preferred subscription is one of a plurality of subscriptions associated with the wireless mobile device that provides a more accurate location of the wireless mobile device than remaining subscriptions of the plurality of subscriptions, and at least one instruction to cause the wireless mobile device to utilize, responsive to a determination that the preferred subscription to perform the positioning operations of the wireless mobile device at the coarse location of the wireless mobile device exists, the preferred subscription for the positioning operations of the wireless mobile device.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure will be readily obtained as the same becomes better understood by reference to the following detailed description when considered in connection with the accompanying drawings which are presented solely for illustration and not limitation of the disclosure, and in which.

DETAILED DESCRIPTION

Figure 1:
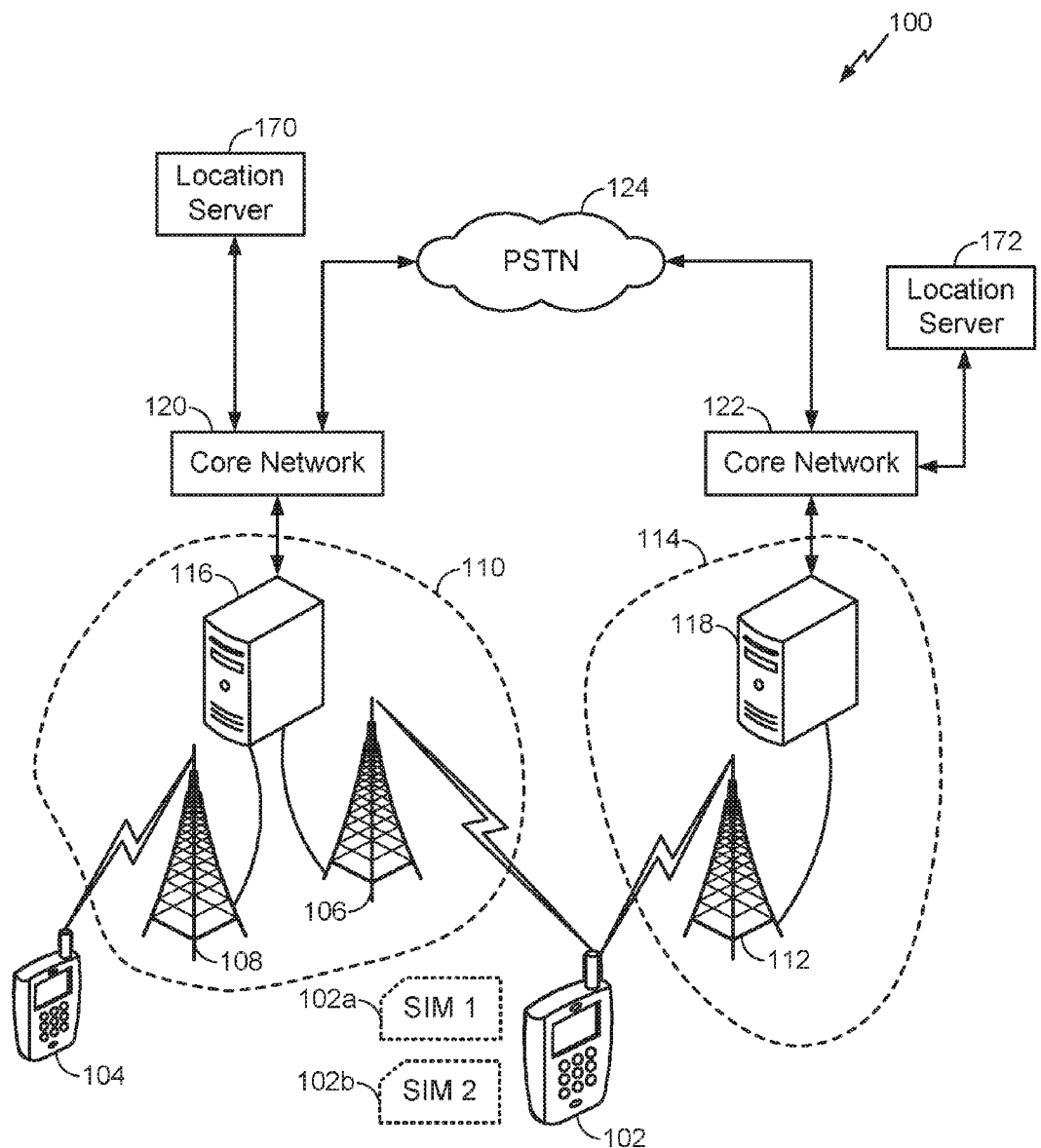
FIG. 1 is a communication system block diagram of a network suitable for use with the various aspects of the disclosure.

Disclosed are methods and apparatuses for determining a location of a wireless mobile device. In an aspect, the wireless mobile device determines whether there is a preferred subscription for performing positioning operations of the wireless mobile device at a coarse location of the wireless mobile device, wherein the preferred subscription is one of a plurality of subscriptions associated with the wireless mobile device that provides a more accurate location of the wireless mobile device than remaining subscriptions of the plurality of subscriptions, and, responsive to a determination that the preferred subscription for performing the positioning operations of the wireless mobile device at the coarse location of the wireless mobile device exists, utilizes the preferred subscription for the positioning operations of the wireless mobile device.

Aspects of the disclosure are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

The terms "wireless mobile device," "wireless communications device," and "mobile device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

As used herein, the terms "SIM," "SIM card," "subscriber identity module," and "subscriber identification module" are used interchangeably to mean a memory that may be an integrated circuit or embedded into a removable card, which stores an International Mobile Subscriber Identity (IMSI), related key, and/or other information used to identify and/or authenticate a wireless mobile device on a network. The term SIM may also be used as shorthand reference to a communication network associated with a particular SIM, since the information stored in a SIM enables the wireless mobile device to establish a communication link with a particular network, thus the SIM and the communication network correlate to one another.

As used herein, the terms "multi-SIM device," "multi-SIM wireless mobile device," "dual-SIM device," and "dual-SIM wireless mobile device" are used interchangeably to describe a wireless mobile device that is configured with more than one SIM and is capable of handling communications with networks of all subscriptions.

Further, many aspects are described in terms of sequences of actions to be performed by, for example, elements of a wireless mobile device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

For the efficient acquisition of wireless communications networks, wireless service carriers have standardized a number of techniques for selecting wireless communications systems in geographic regions and obtaining service therefrom, in accordance with preferences of the subscriber's service provider/carrier. The local wireless communications systems may also support different multiple-access wireless communications protocols, such as code division multiple access (CDMA), wideband CDMA (WCDMA), Advanced Mobile Phone Service (AMPS), Global System for Mobile communications (GSM), General Packet Radio Services (GPRS), or High Data Rate (HDR) technology (e.g., 1×EV technology).

In operation, a conventional wireless mobile device may select and attempt to acquire service on at least one of the available wireless communications systems. To assist with the selection of a desirable system, a wireless mobile device may typically store a system preference list that identifies wireless communications systems that are compatible with the wireless mobile device, and acquisition parameters (e.g., band, frequency, and mode) for the systems listed therein. A wireless mobile device may also perform positioning operations, such as Observed Time Difference of Arrival (OTDOA) or Reference Signal Time Difference (RSTD) measurements for LPP, based on the wireless mobile device's connectivity to a given wireless communications system.

A wireless mobile device may be configured to support multiple SIMs, each of which may be associated with the same or different service providers/communications systems. Accordingly, each subscription in a multi-SIM device may perform an independent network acquisition scan according to its own preference data. Similarly, each subscription may perform its own positioning operations.

Further, although a multi-SIM device may be configured to share resources among different SIMs, communications on each subscription may still be implemented by separate modem stacks. In a multi-SIM device that is configured with a shared radio resource (e.g., a single receive chain), such as a single receive (SR) device, acquisition scans may be performed for each SIM one at a time, thereby prolonging service recovery time. Similarly, positioning measurements for each SIM may be performed separately one at a time, consuming battery power.

Accordingly, in the various aspects of the disclosure, positioning operations may be improved on a multi-SIM device by using the inherent co-location of the various SIMs in the wireless mobile device. For example, as will be described further herein, the wireless mobile device determines which SIM provides the most accurate position determination for a given location and uses that SIM when performing positioning operations at that location.

FIG. 1 illustrates a wireless network system 100 suitable for use with the various aspects. In wireless network system 100, wireless mobile devices 102 and 104 may be configured to establish wireless connections with cell towers or base stations of one or more radio access networks. For example, wireless mobile devices 102 and 104 may transmit/receive data using base stations 106 and 108, which may be part of a network 110, as is known in the art. Wireless mobile device 102 may further be configured to transmit/receive data through base station 112, which may be part of a different network 114.

The wireless networks 110 and 114 may be cellular data networks, and may use channel access methods including, but not limited to, Long-Term Evolution (LTE), Frequency Division Multiple Access (FDMA), Time Division Multiple Access (TDMA), Code Division Multiple Access (CDMA), Universal Mobile Telecommunications Systems (UMTS) (particularly, Long Term Evolution (LTE)), Global System for Mobile Communications (GSM), Wi-Fi, PCS, G-3, G-4, or other protocols that may be used in a wireless communications network or a data communications network. Networks 110 and 114 may use the same or different wireless interfaces and/or physical layers. In an aspect, base stations 106, 108, and 112 may be controlled by one or more base station controllers (BSCs) 116 and 118. For example, base stations 106 and 108, BSC 116, and other components may form network 110. Alternate network configurations may also be used and the disclosure is not limited to the configuration illustrated. For example, in another aspect the functionality of the BSC 116 and at least one of base stations 106 and 108 may be collapsed into a single "hybrid" module having the functionality of these components.

In the various aspects, a wireless mobile device 102 may simultaneously access core networks 120 and 122 after camping on cells managed by base stations 106 and 112. Wireless mobile device 102 may also establish connections with Wi-Fi access points, which may connect to the Internet.

In wireless network system 100, wireless mobile device 102 may be a multi-SIM device that is capable of operating on a plurality of SIMs. For example, the wireless mobile device 102 may be a dual-SIM device having a first SIM-1 102a and a second SIM-2 102b. Using dual-SIM functionality, the wireless mobile device 102 may simultaneously access two core networks 120 and 122 by camping on cells managed by base stations 106 and 112. Core networks 120 and 122 may be interconnected by public switched telephone network (PSTN) 124, across which the core networks 120 and 122 may route various incoming and outgoing communications to the wireless mobile device 102.

Further, utilizing a first SIM of its dual-SIMs (e.g., SIM-1 102a), the wireless mobile device 102 may communicate, via base station 106 and BSC 116, with a location server 170 associated with the core network 120. Likewise, using the other SIM of its dual-SIMs (e.g., SIM-2 102b), the wireless mobile device 102 may communicate, via base station 112 and BSC 118, with a location server 172 associated with core network 122. As will be described further herein, the wireless mobile device 102 may perform positioning operations, such as LPP positioning operations, with the location servers 170 and 172.

The wireless mobile device 102 may make a voice or data call to a third party device, such as wireless mobile device 104, using one of the SIMs. The wireless mobile device 102 may also receive a voice call or other data transmission from a third party. The third party device (e.g., wireless mobile device 104) may be any of a variety of devices, including, but not limited to, a mobile phone, laptop computer, PDA, server, etc.).

For clarity, while the techniques and aspects described herein relate to a wireless mobile device configured with at least one LTE subscription, they may be extended to subscriptions on other radio access networks (e.g., GSM, UMTS, WCDMA, CDMA, etc.).

Figure 2:
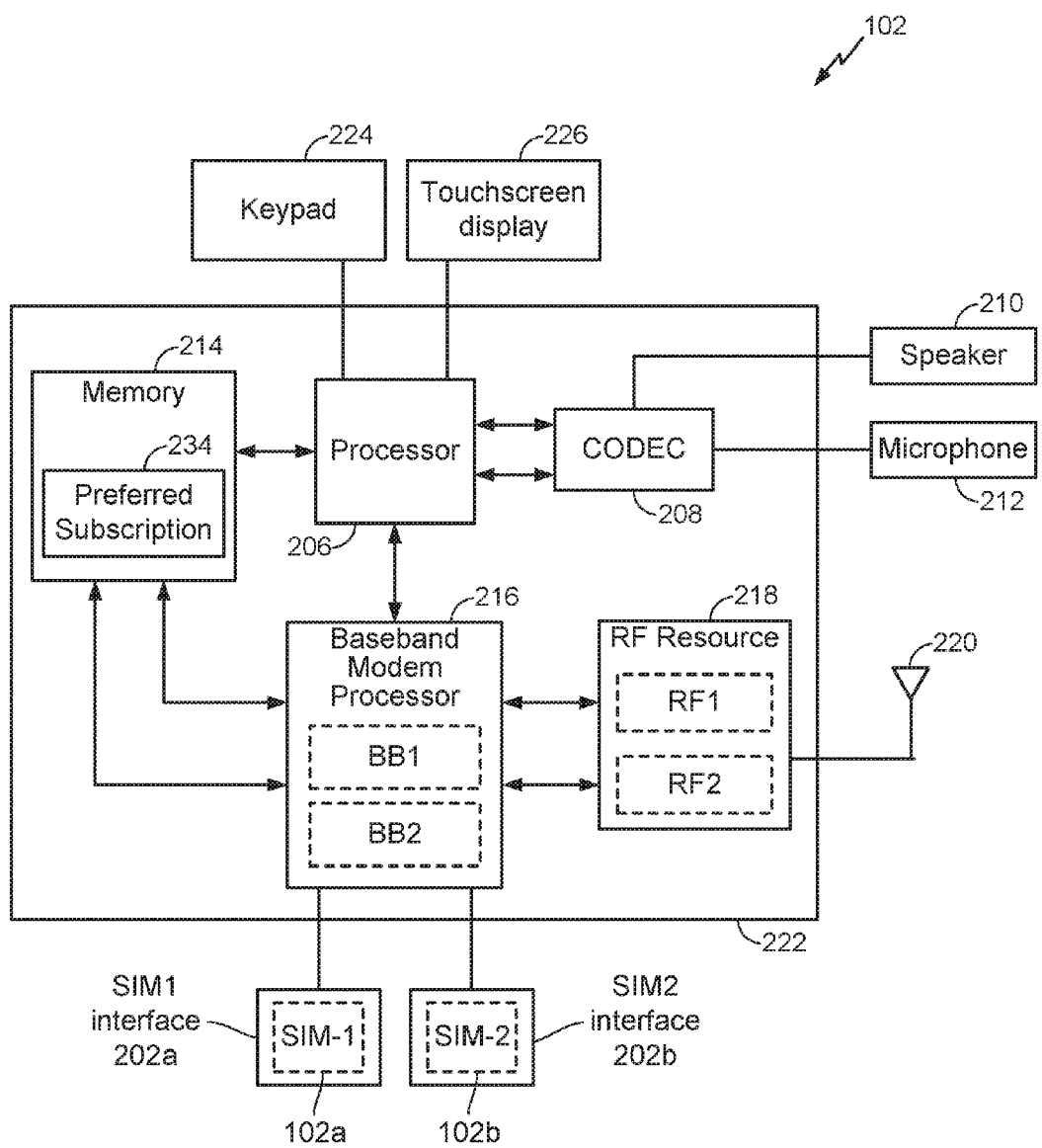
FIG. 2 is a block diagram illustrating a dual-SIM (Subscriber Identity Module) dual active wireless communications device according to an aspect of the disclosure.

FIG. 2 is a functional block diagram of the multi-SIM wireless mobile device 102 that is suitable for implementing the various aspects disclosed herein. Wireless mobile device 102 may include a first SIM interface 202a, which may receive the first SIM-1 102a that is associated with the first subscription. The wireless mobile device 102 may also include a second SIM interface 202b, which may receive the second SIM-2 102b that is associated with the second subscription.

A SIM in the various aspects may be a Universal Integrated Circuit Card (UICC) removable user identity module (R-UIM) or a CDMA subscriber identity module (CSIM) on a card, enabling access to LTE and CDMA networks. Alternatively, in a GSM and/or UMTS network, a SIM may be a UICC that is configured with SIM and/or Universal Subscriber Identity Module (USIM) applications.

Each SIM may contain user account information, an international mobile subscriber identity (IMSI), a set of SIM application toolkit (SAT) commands, and storage space for phone book contacts. A SIM card may further store home identifiers (e.g., a System Identification (SID) Number/ Network Identification (NID) Number pair, a Home Public-Land-Mobile-Network (HPLMN) code, etc.) to indicate the SIM card network operator provider. An Integrated Circuit Card Identity (ICCID) SIM serial number may be printed on the SIM card for identification.

Wireless mobile device 102 may include at least one controller, such as a processor 206, which may be coupled to a coder/decoder (CODEC) 208. The CODEC 208 may in turn be coupled to a speaker 210 and a microphone 212. The processor 206 may also be coupled to at least one memory 214. Memory 214 may be a non-transitory tangible computer-readable storage medium that stores processor-executable instructions. For example, the instructions may include routing communication data relating to the first or second subscription through a corresponding baseband-RF resource chain. The memory 214 may store user application software and executable instructions. The memory 214 may further store a preferred subscription database 234, as will be described further herein.

The processor 206 and memory 214 may each be coupled to at least one baseband modem processor 216. Each SIM in the wireless mobile device 102 (e.g., SIM-1 202a and SIM-2 202b) may be associated with a baseband-RF resource chain. A baseband-RF resource chain may include baseband modem processor 216, which may perform baseband/modem functions for communications on at least one SIM, and may further include one or more amplifiers and radios, referred to generally herein as RF resource 218. RF resource 218 may perform transmit/receive functions for at least one SIM of the wireless mobile device. In an aspect, RF resource 218 may include separate transmit and receive circuitry, or may include a transceiver that combines transmitter and receiver functions. The RF resource 218 may be coupled to a wireless antenna 220.

In one aspect, the wireless mobile device 102 may have a common baseband-RF resource chain for all SIMs in the wireless mobile device (i.e., a single baseband modem processor 216 and a single RF resource 218). In another aspect, different SIMs may be associated with separate baseband-RF resource chains that include physically or logically separate RF resources (i.e., RF1 and RF2), each of which may be coupled to a common baseband modem processor 216 (i.e., a single device that performs baseband/modem functions for all SIMs on the wireless mobile device). Alternatively, different SIMs may be associated with separate baseband-RF resource chain that also include physically or logically separate baseband modem processors (e.g., BB1 and BB2).

The memory 214 of the wireless mobile device 102 may store an operating system (OS) and user application software. In a particular aspect, the processor 206, memory 214, baseband processor(s) 216, and RF resource(s) 218 may be included in a system-on-chip (SoC) device 222. The first and second SIMs 102a and 102b and their corresponding interfaces 202a and 202b may be external to the system-on-chip device 222. Further, various input and output devices may be coupled to components of the system-on-chip device 222, such as interfaces or controllers. Example user input components suitable for use in the wireless mobile device 102 may include, but are not limited to, a keypad 224 and a touchscreen display 226.

Figure 3:
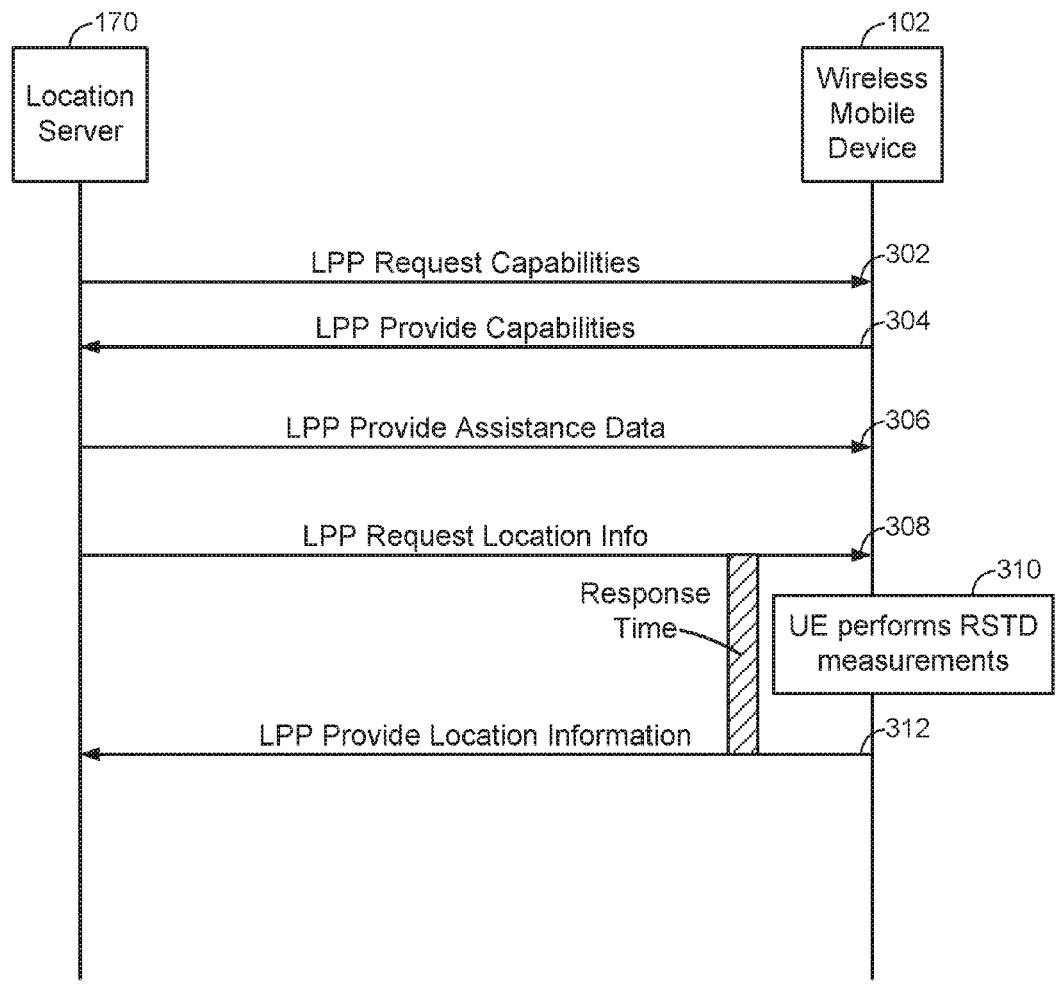
FIG. 3 illustrates a conventional Long-Term Evolution (LTE) Positioning Protocol (LPP) call flow between the wireless mobile device and the location server for performing positioning operations.

FIG. 3 illustrates a conventional LPP call flow between the wireless mobile device 102 and the location server 170 for performing positioning operations. At 302, the location server 170 sends an LPP capabilities request to the wireless mobile device 102. At 304, the wireless mobile device 102 responds with its LPP capabilities. At 306, the location server 170 sends assistance data for LPP positioning operations to the wireless mobile device 102. At 308, the location server 170 sends a request for location information to the wireless mobile device 102. At 310, the wireless mobile device 102 performs RSTD and/or OTDOA measurements. At 312, the wireless mobile device 102 provides its location information to the location server 170, such as the RSTD and/or OTDOA measurements. Note that the time between the request for location information at 308 and the response at 312 is the "response time."

In LPP, the location information request from the location server 170 at 308 is for a specific IMSI (i.e., a subscriber/subscription), and as such, there is no way for the location server 170 (or a location-based service (LBS or LCS)) running on the wireless mobile device 102) to know that there are multiple IMSIs associated with a single wireless mobile device. As such, each subscription (SIM) will perform its own positioning operations in response to a location request. Where each subscription communicates via LTE, each subscription performs LPP positioning operations, which, as discussed above, can be battery-intensive due to the need to perform RSTD/OTDOA measurements.

Accordingly, in the present disclosure, a preferred subscription of a multi-SIM device, such as wireless mobile device 102, is determined for position determinations at a given location. Since each subscription, such as the subscriptions associated with SIM-1 102a and SIM-2 102b, may receive different assistance data, one subscription may provide better location accuracy at a given geographic location than another. As such, choosing the best subscription for position determinations at a given location is desirable.

Upon identifying the preferred subscription for location determinations at a given location, the wireless mobile device 102 tags the preferred subscription with the current location of the wireless mobile device 102. For example, the wireless mobile device 102 may use its geographic (e.g., Global Positioning System (GPS)) coordinates or the set of the serving cells for the two subscriptions at that location, such as set S={S1, S2}, where S1 is the serving cell for the first subscription and S2 is the serving cell for the second subscription.

The wireless mobile device 102 stores the association between the preferred subscription and the given location in the memory 214, for example, in the preferred subscription database 234. Thereafter, when the wireless mobile device 102 receives a location request, unless the geographic coordinates or the set of serving cells has changed, the wireless mobile device 102 can query the preferred subscription database 234 for the preferred subscription at its current location and use that subscription for the requested position determination.

An example of the preferred subscription database 234 utilizing geographic coordinates to identify the location of the wireless mobile device 102 is illustrated in Table 1.

TABLE 1

| Location | Preferred Subscription |
| --- | --- |
| Coordinates(x1, y1, z1) | Subscription1 |
| Coordinates(x2, y2, z2) | Subscription2 |
| Coordinates(x3, y3, z3) | Subscription1 |
| . . . | . . . |

An example of the preferred subscription database 234 utilizing sets of serving cells to identify the location of the wireless mobile device 102 is illustrated in Table 2.

TABLE 2

| Location | Preferred Subscription |
| --- | --- |
| {S1, S2} | Subscription1 |
| {S1, S3} | Subscription1 |
| {S4, S5} | Subscription2 |
| . . . | . . . |

A location request can either originate from the network (e.g., the location server 170) or the wireless mobile device 102 (e.g., from an LCS running on the wireless mobile device 102). Note that the location server can reside on the wireless mobile device or be implemented at the Universal Terrestrial Radio Access Network (UTRAN). In a first scenario, where the location request is network-originated and both subscriptions (e.g., SIM-1 102a and SIM-2 102b) are in the idle state (referred to as "IDLE+IDLE"), the wireless mobile device 102 can determine which subscription should be used to perform positioning measurements (e.g., OTDOA/RSTD measurements) for the position determination. This determination can also be made when the location server resides on the wireless mobile device 102.

Where the location request is initiated by the wireless mobile device 102, the wireless mobile device 102 can determine which subscription should be used at the current location (i.e., which subscription will provide better accuracy at the current location). Where both subscriptions are in the idle state (i.e., "IDLE+IDLE"), the wireless mobile device 102 can determine the preferred subscription to perform positioning measurements and use the most recent assistance data received from the location server for the position determination. The wireless mobile device 102 will not perform measurements on the other subscription(s).

However, where at least one subscription is idle and the user is attempting to initiate a data and/or voice session that will need the location of the wireless mobile device 102 (e.g., a data session or an emergency call), the wireless mobile device 102 can select the preferred subscription and start the session on that subscription. This can help to provide an improved user experience, insofar as the wireless mobile device 102 can use the same subscription, i.e., the preferred subscription, for the session rather than switching to the preferred subscription during the session to perform the position determination.

There are a number of advantages to the subscription selection described herein. For example, it is highly usable for emergency call scenarios, for example, E911, because the call can be placed using the subscription that will provide the greatest location accuracy. Whether or not a call is an emergency call can be one of the parameters in SIM selection when initiating a voice or data session.

Where the wireless mobile device 102 is a single receive device, another advantage is that when the user is on an active data session, the subscription selection described herein can determine whether to do location based measurements using the active data session subscription, or create compressed-mode gaps to perform positioning measurements on the other subscription. In addition, because an intelligent decision to perform compressed-mode measurements is made during the data call, throughput degradation due to a position determination is minimized.

Yet another advantage is that because the OTDOA/RSTD measurements are only being performed by one subscription at a given location, there is a gain in battery life.

Figure 4:
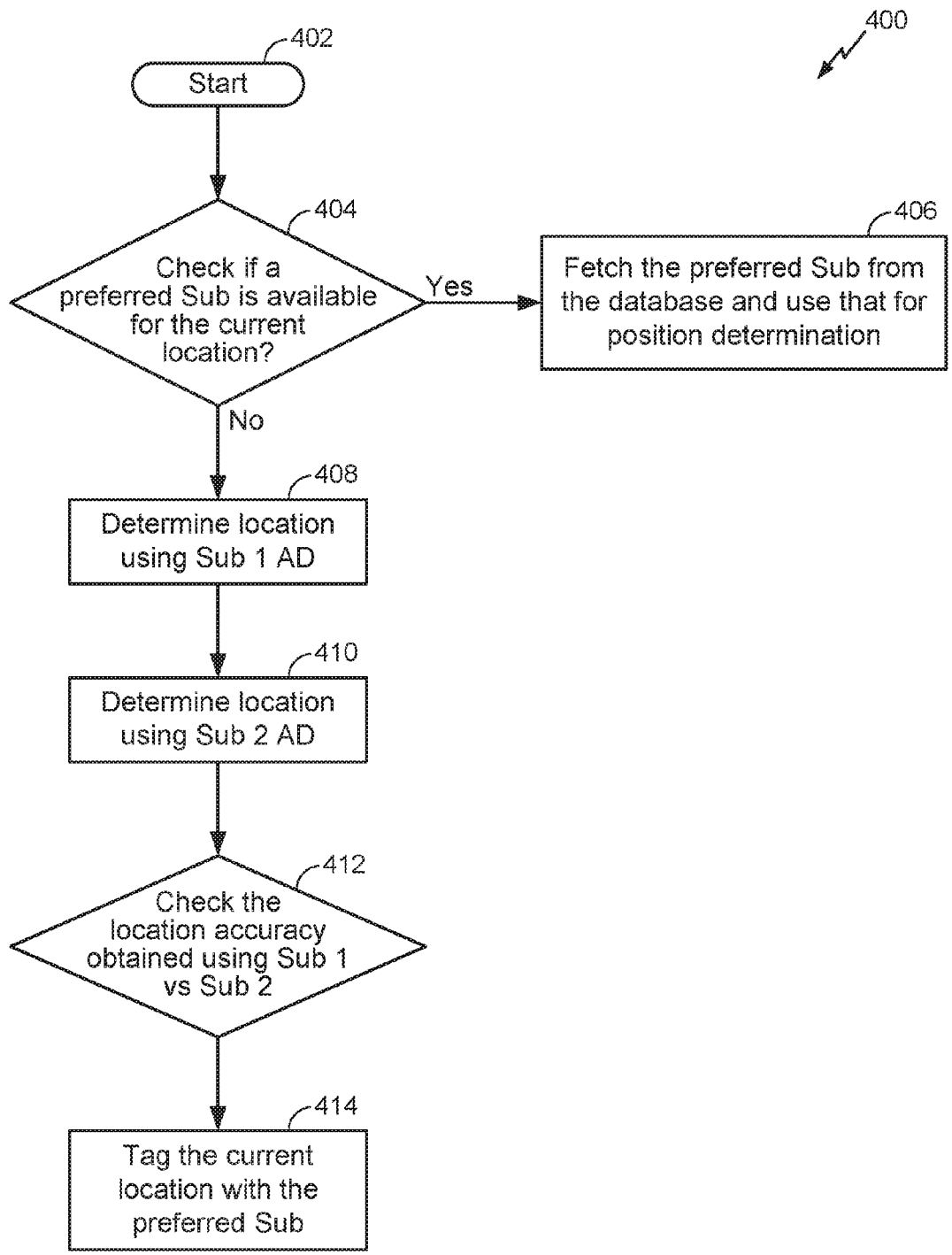
FIG. 4 illustrates an exemplary flow for determining a preferred subscription for a given location according to at least one aspect of the disclosure.

FIG. 4 illustrates an exemplary flow 400 for determining a preferred subscription for a given location according to at least one aspect of the disclosure, referred to herein as "subscription switch diversity" (SSD). The flow 400 may be performed by the wireless mobile device 102. The flow 400 may be initiated in response to a location request from an LCS running on the wireless mobile device 102 or a location server, such as location server 170.

Whenever there is a location request from an LCS or a location server (e.g., location server 170), the wireless mobile device 102 will compute its location using the assistance data for each of its subscriptions (e.g., corresponding to the SIM-1 102a and the SIM-2 102b) individually. Based on the position determination using the assistance data from both each subscription at the same location, the wireless mobile device 102 can identify which subscription is more reliable and provides more accurate location information at the current location. The preferred subscription is then tagged to the current location either based on the geographic (e.g., GPS) coordinates of the current location or the set of the serving cells for the multiple subscriptions S={S1, S2, . . . Sn}, where S1, S2, and Sn represent the serving cell of one subscription of the multiple subscriptions on the wireless mobile device 102. In the future, the above algorithm is repeated only when the location of the wireless mobile device 102 has changed. Otherwise, the preferred subscription can be directly fetched from the preferred subscription database 234, which is updated every time the algorithm runs at a particular location.

Turning now to the flow 400 illustrated in FIG. 4, the SSD algorithm begins at 402. At 404, the wireless mobile device 102 (e.g., processor 206) checks the preferred subscription database 234 to determine whether or not the current location is tagged as having a preferred subscription for location determination. More specifically, the wireless mobile device 102 may determine its current, or coarse, location by, for example, determining its geographic (e.g., GPS) coordinates or the set of the serving cells for its multiple subscriptions/SIMs (e.g., the set S of {S1, S2, . . . Sn}). The wireless mobile device 102 then searches the preferred subscription database 234 to determine whether or not there is a corresponding entry in the preferred subscription database 234 for the current/coarse location.

At 406, responsive to a determination at 404 that the preferred subscription for performing the positioning operations of the wireless mobile device 102 at the current/coarse location of the wireless mobile device 102 exists, that is, if there is an entry in the preferred subscription database 234 for the current/coarse location, the wireless mobile device 102 (e.g., processor 206) fetches an identifier of the preferred subscription (e.g., SIM-1 102a) from the preferred subscription database 234, switches to that subscription, and uses the preferred subscription to perform a position determination, such as the LPP positioning operations illustrated in FIG. 3.

However, responsive to a determination at 404 that a preferred subscription for performing the positioning operations of the wireless mobile device 102 at the current/coarse location of the wireless mobile device 102 does not exist, that is, if there is not an entry in the preferred subscription database 234 for the current/coarse location, then at 408, the wireless mobile device 102 (e.g., processor 206 in conjunction with the baseband modem processor 216, the RF resource(s) 218, and the wireless antenna 220) performs positioning operations using a first candidate subscription of the multiple subscriptions of the wireless mobile device 102 (e.g., SIM-1 102a) based on assistance data for the first candidate subscription received from the location server associated with the first candidate subscription (e.g., location server 170). The first candidate subscription may perform the LPP positioning operations illustrated in FIG. 3, for example.

At 410, the wireless mobile device 102 (e.g., processor 206 in conjunction with the baseband modem processor 216, the RF resource(s) 218, and the wireless antenna 220) performs positioning operations using a second candidate subscription of the multiple subscriptions of the wireless mobile device 102 (e.g., SIM-2 102b) based on assistance data for the second candidate subscription received from the location server associated with the second candidate subscription (e.g., location server 172). The second candidate subscription may perform the LPP positioning operations illustrated in FIG. 3, for example.

Although not illustrated in FIG. 4, not all subscriptions may be capable of performing location-based services, and therefore positioning operations. In that case, the wireless mobile device 102 determines whether there is more than one subscription capable of performing location-based services/positioning operations (referred to as "candidate" subscriptions), and if there is, those are the candidate subscriptions that perform the positioning operations at 408 and 410. Further, if there are more than two candidate subscriptions capable of performing location-based services/positioning operations, the wireless mobile device 102 will perform positioning operations for each such candidate subscription based on assistance data for each subscription received from the associated location server. It is understood that, in discussions throughout the disclosure about a preferred subscription, when more than one candidate subscription is capable of performing a location-based service, then the preferred subscription is among the more than one candidate subscription that is capable of performing the location-based service.

At 412, the wireless mobile device 102 (e.g., processor 206) compares the location accuracy provided by the first candidate subscription to the location accuracy provided by the second candidate subscription to determine which subscription provides better accuracy. If there are more than two candidate subscriptions, the wireless mobile device 102 compares the location accuracy of each candidate subscription to determine which candidate subscription provides the highest accuracy.

At 414, the wireless mobile device 102 (e.g., processor 206 in conjunction with memory 214) stores an identifier of the candidate subscription that provides the highest accuracy as the preferred subscription for the current/coarse location of the wireless mobile device 102 in the preferred subscription database 234, thereby setting the candidate subscription that provides the highest accuracy as the preferred subscription for the current/coarse location of the wireless mobile device 102. The wireless mobile device 102 (e.g., processor 206 in conjunction with the wireless antenna 220) also uses the location determined by the preferred subscription to respond to the location request received from the LCS or the location server.

Hence, for example, in an implementation with two subscriptions, a first candidate subscription and a second candidate subscription, responsive to a determination that a preferred subscription for performing the positioning operations of the wireless mobile device 102 at the coarse location of the wireless mobile device 102 does not exist, the first candidate subscription determines a first location of the wireless mobile device 102 at the coarse location of the wireless mobile device 102, and the second candidate subscription determines a second location of the wireless mobile device 102 at the coarse location of the wireless mobile device 102. The wireless mobile device 102 then determines whether the first location or the second location is more accurate and, responsive to a determination that the first location is more accurate than the second location, sets the first candidate subscription as the preferred subscription for the coarse location of the wireless mobile device 102.

Figure 5:
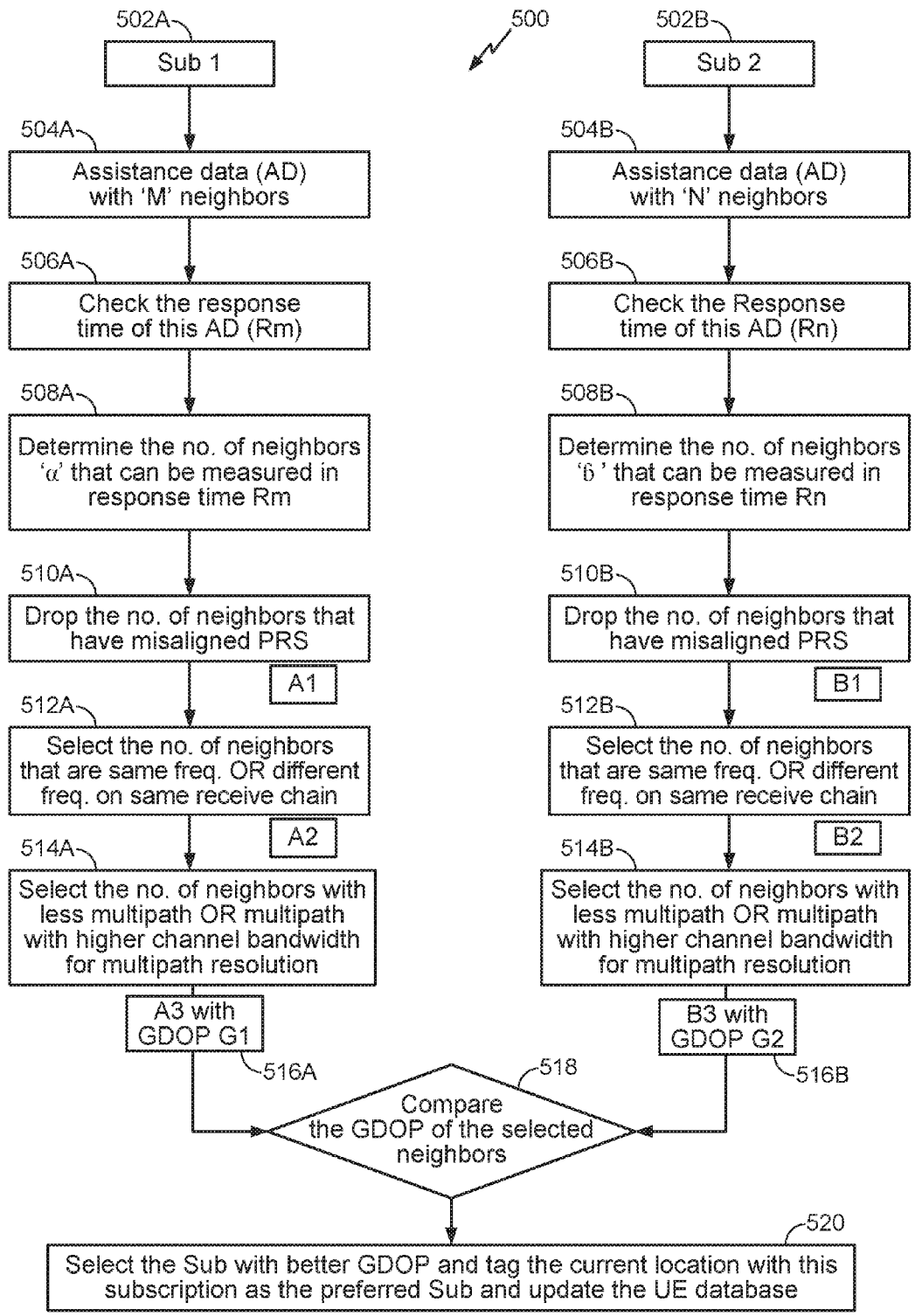
FIG. 5 illustrates an exemplary flow for determining a preferred subscription for a given location according to at least one aspect of the disclosure.

FIG. 5 illustrates an exemplary flow 500 for determining a preferred subscription for a given location according to at least one aspect of the disclosure, referred to herein as "stale neighbor rejection." The flow 500 may be performed by the wireless mobile device 102. The flow 500 may be initiated in response to a location request from an LCS on the wireless mobile device 102 or a location server, such as location server 170.

In the "stale neighbor rejection" approach, each subscription (e.g., SIM-1 102a and SIM-2 102b) on the wireless mobile device 102 determines the neighbor cells that it should consider and select for OTDOA/RSTD measurements out of all of the neighbor cells provided in the assistance data from the associated application server. Each subscription maintains a list of active neighbor cells A={A1, A2, . . . An} and a list of barred neighbor cells B={B1, B2, . . . Bn}. Initially, all the neighbor cells received in the assistance data for each subscription are placed in the list of active neighbor cells and the list of barred neighbor cells is empty. At every step of the neighbor cell rejection, the neighbor cells that are rejected are moved from list of active neighbor cells to the list of barred neighbor cells. Once the stale neighbor cells have been removed from the list of active neighbor cells, the wireless mobile device 102 calculates a prediction of location accuracy (e.g., geometric dilution of precision (GDOP)) for each subscription based only on the lists of active neighbor cells of each subscription. The wireless mobile device 102 selects the subscription with the best prediction of location accuracy, which may, in some implementations, be the prediction of location accuracy with the highest geographic distribution of neighbor cells in its active list of neighbor cells.

The following are factors that can be considered when evaluating a subscription's performance to compute the current prediction of location accuracy:

Neighbor Cell Response Time: In addition to the assistance data provided to determine the location of the wireless mobile device 102, the location server (e.g., location server 170) can also provide the response time in which the wireless mobile device 102 should complete the OTDOA/RSTD measurements and report back to the location server for the location computation. The wireless mobile device 102 checks the response time provided in the assistance data, and with the knowledge of the neighbor cells associated with the assistance data, neighbor distribution (e.g., intra- versus inter-frequency), and the capabilities of the wireless mobile device 102 (e.g., in terms of tune time), can determine the number of neighbor cells that can be measured within that response time. The neighbor cells that cannot be measured within the response time are removed from the list of active neighbor cells to the list of barred neighbor cells.

Network Synchronization for Position Reference Signal (PRS): Based on the neighbor cells provided in the assistance data for each subscription, the wireless mobile device 102 can determine the intra-frequency neighbor cells for which the positioning sub-frames (e.g., PRS sub-frames) are not aligned. These neighbor cells would cause interference and inaccuracy to the position determination. In this step, the wireless mobile device 102 removes the misaligned neighbor cells from the list of active neighbor cells to the list of barred neighbor cells.

Inter-frequency versus Intra-frequency Neighbor Cells: Inter-frequency neighbor cells may have a higher accuracy associated with their measurements as compared to intra-frequency neighbor cells. This is because the wireless mobile device 102 may use different radio frequency (RF) and digital paths for different bands/frequencies, which may have different associated path delays. Depending on the neighbor cells, their band frequency, and the wireless mobile device's 102 band support capability on multiple receive chains, the wireless mobile device 102 can intelligently determine which of the neighbor cells from the inter-frequency group can be used along with intra-frequency neighbor cells without affecting the accuracy of the OTDOA/RSTD measurements. The wireless mobile device 102 can use this intelligence since it can support multiple different bands using the same chain. The wireless mobile device 102 removes the neighbor cells that use different RF chains from the list of active neighbor cells to the list of barred neighbor cells. Alternatively, all inter-band neighbor cells may be removed from the list of active neighbor cells if the wireless mobile device's 102 band support is not exploited.

Multipath Resolution: Neighbor cells with multiple paths will result in inaccurate OTDOA/RSTD measurements and will thereby cause the location measurements to be inaccurate. In this scenario, the wireless mobile device 102 checks the neighbor cells in the assistance data for each subscription and drops the neighbor cells that have multiple paths with high energies. Also, since such neighbor cells will be from different bands and each band will have a different channel bandwidth in LTE, the wireless mobile device 102 can prioritize the neighbor cells that have higher bandwidths, as that will help in resolution of the multipath. The information about the bandwidth and the paths with multiple energies is available from the modem software (e.g., baseband modem processor 216). The wireless mobile device 102 removes the neighbor cells with multiple fingers of high energies from the list of active neighbor cells to the list of barred neighbor cells.

Based on these parameters, each subscription on the wireless mobile device 102 drops neighbor cells in each step of stale neighbor rejection and then computes its final prediction of location accuracy (e.g., GDOP) based on the assistance data for the remaining neighbor cells. Based on the prediction of location accuracy for each subscription, the wireless mobile device 102 can determine the subscription that will provide the highest accuracy for the requested location determination and select that subscription as the preferred subscription for the current location of the wireless mobile device 102. The current location can be represented as, for example, the current geographic (e.g., GPS) coordinates of the wireless mobile device 102 or the set of the serving cells of the multiple available subscriptions on the wireless mobile device 102. Unless the location of the wireless mobile device 102 changes, the preferred subscription will be utilized for any further location requests from an LCS or a location server without re-running the stale neighbor rejection algorithm from the start.

Turning now to the flow 500 illustrated in FIG. 5, the stale neighbor rejection algorithm begins at 502A/502B. As will be seen in the discussion further below, neighbor cell rejection can be based on factors including neighbor cell response time, network synchronization, inter-frequency versus intra-frequency neighbor cell rejection, multipath resolution, or any combination thereof. At 504A, the wireless mobile device 102 (e.g., processor 206 in conjunction with wireless antenna 220) receives assistance data for a first candidate subscription (e.g., SIM-1 102a) from the associated location server (e.g., location server 170) containing M neighbor cells (such as at 306 of FIG. 3). Similarly, at 504B, the wireless mobile device 102 (e.g., processor 206 in conjunction with wireless antenna 220) receives assistance data for a second candidate subscription (e.g., SIM-2 102b) from the associated location server (e.g., location server 172) containing N neighbor cells (such as at 306 of FIG. 3).

At 506A, the wireless mobile device 102 (e.g., processor 206) checks the neighbor cell response time included in the assistance data for the first candidate subscription, referred to as response time $R_m$. Likewise, at 506B, the wireless mobile device 102 (e.g., processor 206) checks the response time included in the assistance data for the second candidate subscription, referred to as response time $R_n$. The wireless mobile device 102 (e.g., processor 206) evaluates the "response time" factor by, at 508A, determining the number of neighbor cells a contained in the assistance data for the first candidate subscription that can be measured within response time $R_m$ and, at 508B, determining the number of neighbor cells 6 contained in the assistance data for the second candidate subscription that can be measured within response time $R_n$. These neighbor cells are selected for further processing. Hence, for example, in an implementation with two subscriptions, a first subscription and a second subscription, the wireless mobile device 102 performs neighbor cell rejection based on the neighbor cell response time by removing neighbor cells from the first list of active neighbor cells that cannot be measured by the first subscription within a first response time provided in the first positioning assistance data, and removing neighbor cells from the second list of active neighbor cells that cannot be measured by the second subscription within a second response time provided in the second positioning assistance data.

The wireless mobile device 102 (e.g., processor 206) next evaluates the "network synchronization" factor by, at 510A, removing the neighbor cells contained in the assistance data for the first candidate subscription that have misaligned PRS from the list of active neighbor cells to the list of barred neighbor cells, resulting in the list of active neighbor cells "A1." Likewise, at MOB, the wireless mobile device 102 removes the neighbor cells contained in the assistance data for the second candidate subscription that have misaligned PRS from the list of active neighbor cells to the list of barred neighbor cells, resulting in the list of active neighbor cells "B1."

The wireless mobile device 102 (e.g., processor 206) next evaluates the "inter-frequency versus intra-frequency neighbor cells" factor by, at 512A, selecting the neighbor cells in the active list "A1" that have the same frequency or that are on a different frequency but that are on the same receive chain, and removing the remaining neighbor cells from the list of active neighbor cells to the list of barred neighbor cells, resulting in the list of active neighbor cells "A2." Likewise, at 512B, the wireless mobile device 102 selects the neighbor cells in the list of active neighbor cells "B1" that have the same frequency or that are on a different frequency but that are on the same receive chain, and removes the remaining neighbor cells from the list of active neighbor cells to the list of barred neighbor cells, resulting in the list of active neighbor cells "B2."

Next, the wireless mobile device 102 (e.g., processor 206) evaluates the "multipath resolution" factor by, at 514A, selecting the neighbor cells in the list of active neighbor cells "A2" that have less multipath or multipath with higher channel bandwidth for multipath resolution, and removing the remaining neighbor cells from the list of active neighbor cells to the list of barred neighbor cells, resulting in the list of active neighbor cells "A3." Likewise, at 514B, the wireless mobile device 102 selects the neighbor cells in the list of active neighbor cells "B2" that have less multipath or multipath with higher channel bandwidth for multipath resolution, and removing the remaining neighbor cells from the list of active neighbor cells to the list of barred neighbor cells, resulting in the list of active neighbor cells "B3." Hence, for example, in an implementation with two subscriptions, a first candidate subscription and a second candidate subscription, the wireless mobile device 102 removes neighbor cells from a first list of active neighbor cells for the first candidate subscription that have multipath greater than a first multipath threshold or multipath with channel bandwidth less than a first bandwidth threshold for multipath resolution, and removes neighbor cells from a second list of active neighbor cells for the second candidate subscription that have multipath greater than a second multipath threshold or multipath with channel bandwidth less than a second bandwidth threshold for multipath resolution.

At 516A, the wireless mobile device (e.g., processor 206) calculates the prediction of location accuracy (e.g., GDOP) for the neighbor cells remaining in the list of active neighbor cells "A3," and at 516B, calculates the prediction of location accuracy (e.g., GDOP) for the neighbor cells remaining in the list of active neighbor cells "B3." At 518, the wireless mobile device 102 (e.g., processor 206) compares the prediction of location accuracy of each candidate subscription, and at 520, selects the candidate subscription with the highest prediction of location accuracy as the preferred subscription for the current location of the wireless mobile device 102. Hence, for example, in an implementation with two candidate subscriptions, a first candidate subscription and a second candidate subscription, the wireless mobile device 102 compares a first prediction of location accuracy provided by the first candidate subscription to a second prediction of location accuracy provided by the second candidate subscription. The wireless mobile device 102 then determines whether the first prediction of location accuracy is higher than the second prediction of location accuracy, and, responsive to a determination that the first prediction of location accuracy is higher than the second prediction of location accuracy, the wireless mobile device 102 sets the first candidate subscription as the preferred subscription for the coarse location of the wireless mobile device 102. In implementations with two or more candidate subscriptions, the wireless mobile device 102 (e.g., processor 206 in conjunction with the memory 214) tags its current location in the preferred subscription database 234 with the preferred subscription, thereby setting the preferred subscription for the coarse location. The wireless mobile device 102 (e.g., processor 206 in conjunction with the wireless antenna 220) also uses the location determined by the preferred subscription to respond to the location request received from the LCS or the location server.

Although FIG. 5 illustrates only two subscriptions, it will be appreciated that operations 502A/B to 516A/B may be performed for any number of subscriptions on the wireless mobile device 102 greater than two. Likewise, it will be appreciated that operations 518 and 520 may be performed for any number of subscriptions on the wireless mobile device 102 greater than two.

Figure 6:
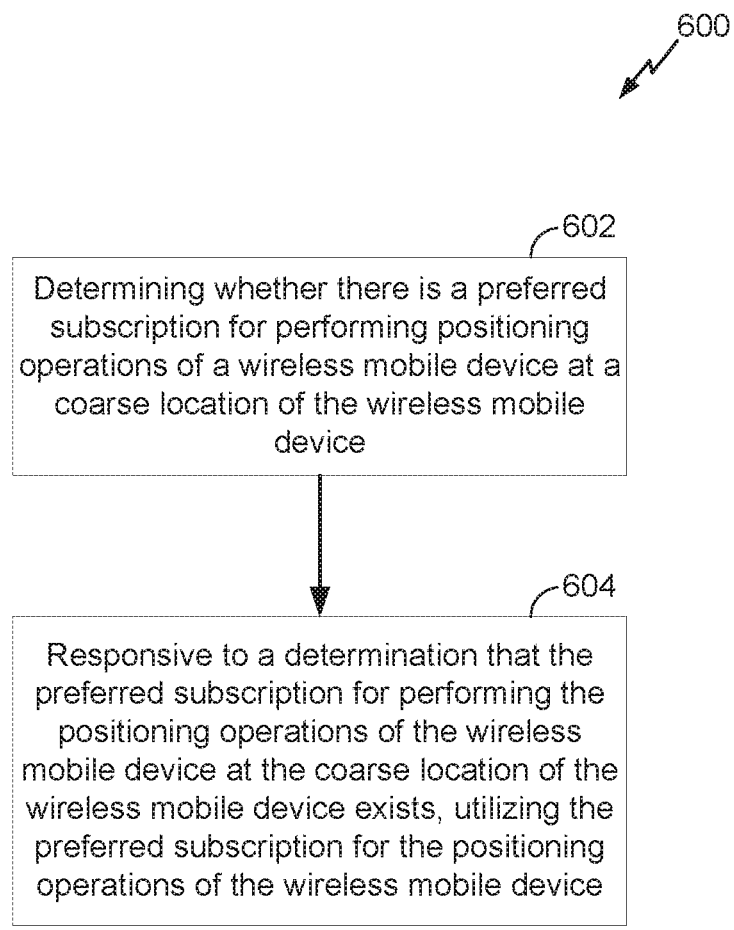
FIG. 6 illustrates an exemplary flow for determining a location of a wireless mobile device.

FIG. 6 illustrates an exemplary flow 600 for determining a location of a wireless mobile device, such as wireless mobile device 102.

At 602, the wireless mobile device 102 (e.g., processor 206 in conjunction with the preferred subscription database 234) determines whether there is a preferred subscription for performing positioning operations of the wireless mobile device 102 at a coarse location of the wireless mobile device 102, such as at 404 of FIG. 4. The preferred subscription may be one of a plurality of subscriptions associated with the wireless mobile device 102 that provides a more accurate location of the wireless mobile device 102 than the remaining subscriptions of the plurality of subscriptions. The preferred subscription may be determined as discussed above with reference to FIGS. 4 and 5.

At 604, responsive to a determination that a preferred subscription for performing the positioning operations of the wireless mobile device 102 at the coarse location of the wireless mobile device 102 exists, the wireless mobile device 102 (e.g., processor 206 in conjunction with baseband modem processor 216, RF resource 218, and SIM-1 102a or SIM-2 102b) utilizes the preferred subscription for the positioning operations of the wireless mobile device 102, such as at 406 of FIG. 4.

Figure 7:
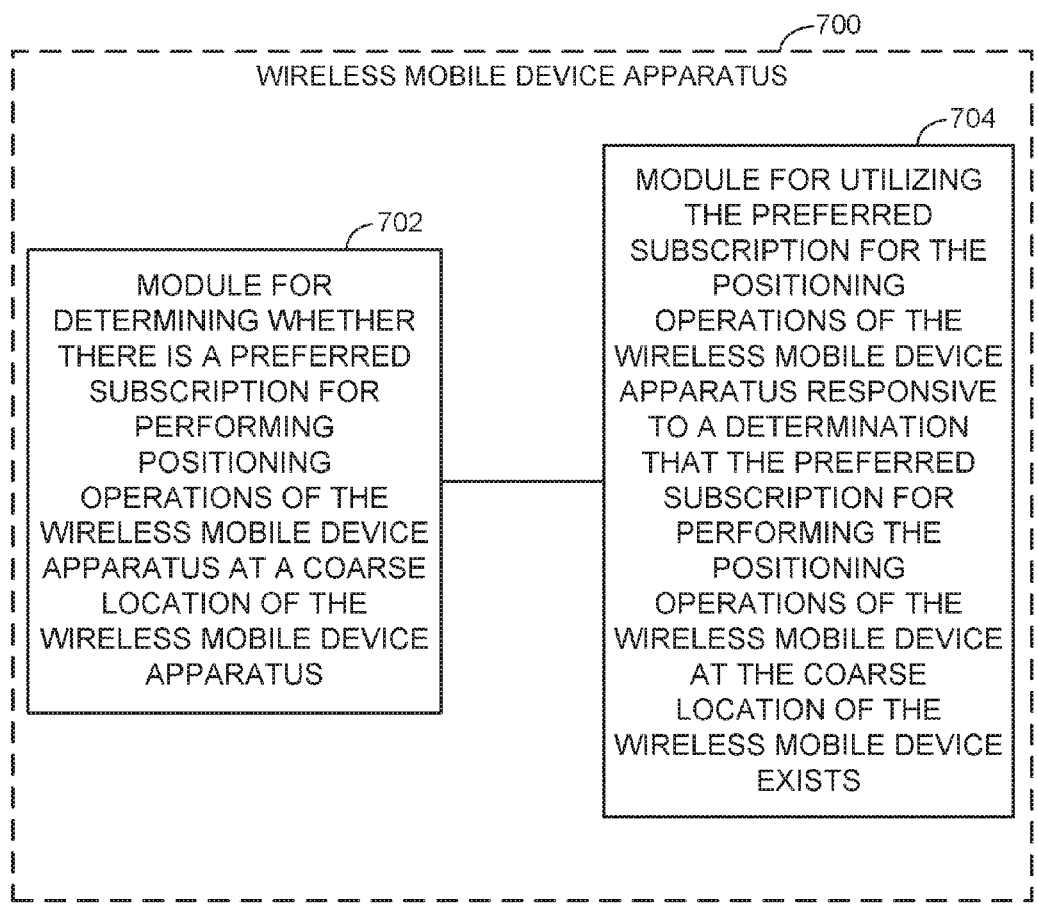
FIG. 7 is a simplified block diagram of several sample aspects of a wireless mobile device apparatus configured to support communications as taught herein.

FIG. 7 illustrates an example wireless mobile device apparatus 700, such as wireless mobile device 102, represented as a series of interrelated functional modules. A module for determining 702 may correspond at least in some aspects to, for example, a processing system in conjunction with a storage device, such as processor 206 in conjunction with the preferred subscription database 234, as discussed herein. A module for utilizing 704 may correspond at least in some aspects to, for example, a processing system, such as processor 206 in conjunction with baseband modem processor 216, RF resource 218, and SIM-1 102a or SIM-2 102b, as discussed herein.

The functionality of the modules of FIG. 7 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 7, as well as other components and functions described herein, may be implemented using any suitable means. Such means also may be implemented, at least in part, using corresponding structure as taught herein. For example, the components described above in conjunction with the "module for" components of FIG. 7 also may correspond to similarly designated "means for" functionality. Thus, in some aspects one or more of such means may be implemented using one or more of processor components, integrated circuits, or other suitable structure as taught herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of determining a location of a wireless mobile device, comprising:
   determining, by the wireless mobile device, whether there is a preferred subscription for performing positioning operations of the wireless mobile device at a coarse location of the wireless mobile device, wherein the preferred subscription is one of a plurality of subscriptions associated with the wireless mobile device that provides a more accurate location of the wireless mobile device than remaining subscriptions of the plurality of subscriptions; and
   responsive to a determination that the preferred subscription for performing the positioning operations of the wireless mobile device at the coarse location of the wireless mobile device exists, utilizing, by the wireless mobile device, the preferred subscription for the positioning operations of the wireless mobile device.

2. The method of claim 1, further comprising:
   determining, by the wireless mobile device, whether there is more than one candidate subscription of the plurality of subscriptions capable of performing a location-based service,
   responsive to a determination that more than one candidate subscription of the plurality of subscriptions capable of performing the location-based service exists, performing the determining, wherein the preferred subscription is one of the more than one candidate subscriptions.

3. The method of claim 1, wherein the coarse location of the wireless mobile device is based on identities of cells serving the plurality of subscriptions.

4. The method of claim 1, further comprising:
   responsive to a determination that the preferred subscription for performing the positioning operations of the wireless mobile device at the coarse location of the wireless mobile device does not exist:
      determining, at the wireless mobile device by a first subscription of the plurality of subscriptions, a first location of the wireless mobile device at the coarse location of the wireless mobile device;
      determining, at the wireless mobile device by a second subscription of the plurality of subscriptions, a second location of the wireless mobile device at the coarse location of the wireless mobile device;
      determining, by the wireless mobile device, whether the first location or the second location is more accurate; and
      responsive to a determination that the first location is more accurate than the second location, setting, by the wireless mobile device, the first subscription as the preferred subscription for the coarse location of the wireless mobile device.

5. The method of claim 4, wherein setting the first subscription as the preferred subscription comprises storing an association between the coarse location and the first subscription.

6. The method of claim 1, further comprising:
   responsive to a determination that the preferred subscription for performing positioning operations of the wireless mobile device at the coarse location of the wireless mobile device does not exist:
      receiving, at the wireless mobile device, first positioning assistance data for a first subscription of the plurality of subscriptions;

receiving, at the wireless mobile device, second positioning assistance data for a second subscription of the plurality of subscriptions;
comparing a first prediction of location accuracy provided by the first subscription to a second prediction of location accuracy provided by the second subscription;
determining, by the wireless mobile device, whether the first prediction of location accuracy is higher than the second prediction of location accuracy; and
responsive to a determination that the first prediction of location accuracy is higher than the second prediction of location accuracy, setting, by the wireless mobile device, the first subscription as the preferred subscription for the coarse location of the wireless mobile device.

7. The method of claim 6, wherein a prediction of location accuracy comprises geometric dilution of precision (GDOP).

8. The method of claim 6, wherein the first positioning assistance data comprises a first set of neighbor cells and the second positioning assistance data comprises a second set of neighbor cells, and
wherein the comparing comprises:
setting, by the first subscription, a first list of active neighbor cells to the first set of neighbor cells;
setting, by the second subscription, a second list of active neighbor cells to the second set of neighbor cells;
performing, by the first subscription, neighbor cell rejection based on the first list of active neighbor cells;
performing, by the second subscription, neighbor cell rejection based on the second list of active neighbor cells; and
determining, by the wireless mobile device, whether the first prediction of location accuracy is higher than the second prediction of location accuracy based on a first geographic distribution of neighbor cells in the first list of active neighbor cells compared to a second geographic distribution of neighbor cells in the second list of active neighbor cells.

9. The method of claim 8, wherein performing the neighbor cell rejection is based on factors including neighbor cell response time, network synchronization, inter-frequency versus intra-frequency neighbor cell rejection, multipath resolution, or any combination thereof.

10. The method of claim 9, wherein performing the neighbor cell rejection based on the neighbor cell response time comprises:
removing neighbor cells from the first list of active neighbor cells that cannot be measured by the first subscription within a first response time provided in the first positioning assistance data; and
removing neighbor cells from the second list of active neighbor cells that cannot be measured by the second subscription within a second response time provided in the second positioning assistance data.

11. The method of claim 9, wherein performing the neighbor cell rejection based on the network synchronization comprises:
removing neighbor cells from the first list of active neighbor cells that have misaligned position reference signals (PRS); and
removing neighbor cells from the second list of active neighbor cells that have misaligned position reference signals (PRS).

12. The method of claim 9, wherein performing the neighbor cell rejection based on the inter-frequency versus intra-frequency neighbor cell rejection comprises:
removing inter-frequency neighbor cells and intra-frequency neighbor cells in the first list of active neighbor cells that are not on a same receive chain associated with the first subscription; and
removing inter-frequency neighbor cells and intra-frequency neighbor cells in the second list of active neighbor cells that are not on a same receive chain associated with the second subscription.

13. The method of claim 9, wherein performing the neighbor cell rejection based on the multipath resolution comprises:
removing neighbor cells from the first list of active neighbor cells that have multipath greater than a first multipath threshold or multipath with channel bandwidth less than a first bandwidth threshold for multipath resolution; and
removing neighbor cells from the second list of active neighbor cells that have multipath greater than a second multipath threshold or multipath with channel bandwidth less than a second bandwidth threshold for multipath resolution.

14. The method of claim 1, further comprising:
receiving, at the wireless mobile device, a location request from a network serving the wireless mobile device, wherein the wireless mobile device determines whether the preferred subscription exists, in response to the location request.

15. The method of claim 14, wherein the location request is received in response to the wireless mobile device initiating an emergency call.

16. The method of claim 1, wherein the positioning operations include performing observed time difference of arrival (OTDOA) or reference signal time difference (RSTD) measurements.

17. The method of claim 1, wherein the wireless mobile device is a multi-subscriber identity module (SIM) device.

18. The method of claim 1, wherein the plurality of subscriptions comprise a plurality of SIMs.

19. A wireless mobile device for determining a location of the wireless mobile device, comprising:
at least one processor configured to:
determine whether there is a preferred subscription to perform positioning operations of the wireless mobile device at a coarse location of the wireless mobile device, wherein the preferred subscription is one of a plurality of subscriptions associated with the wireless mobile device that provides a more accurate location of the wireless mobile device than remaining subscriptions of the plurality of subscriptions; and
utilize, responsive to a determination that the preferred subscription to perform the positioning operations of the wireless mobile device at the coarse location of the wireless mobile device exists, the preferred subscription for the positioning operations of the wireless mobile device.

20. A non-transitory computer-readable medium storing computer-readable instructions for determining a location of a wireless mobile device, the computer-readable instructions comprising:
at least one instruction to cause the wireless mobile device to determine whether there is a preferred subscription to perform positioning operations of the wireless mobile device at a coarse location of the wireless mobile device, wherein the preferred subscription is one of a plurality of subscriptions associated with the wireless mobile device that provides a more accurate location of the wireless mobile device than remaining subscriptions of the plurality of subscriptions; and at least one instruction to cause the wireless mobile device to utilize, responsive to a determination that the preferred subscription to perform the positioning operations of the wireless mobile device at the coarse location of the wireless mobile device exists, the preferred subscription for the positioning operations of the wireless mobile device.

\* \* \* \* \*